(12) United States Patent
Clausen et al.

(10) Patent No.: US 9,329,015 B2
(45) Date of Patent: May 3, 2016

(54) OBJECT FEEDER SYSTEM

(75) Inventors: Tais Clausen, Klagshamn (SE); Rune Fisker, Virum (DK); Karl-Josef Hollenbeck, Copenhagen (DK); Christian Højris Nielsen, Copenhagen (DK); Mikkel Bille Stegmann, Vanløse (DK); Morten Rudkjær Schrøder, Copenhagen (DK); Søren Greve Jensen, Vemmelev (DK); Bo Petersen, Dyssegård (DK)

(73) Assignee: 3SHAPE A/S, Copenhagen K (DK)

( * ) Notice: Subject to any disclaimer, the term of this patent is extended or adjusted under 35 U.S.C. 154(b) by 678 days.

(21) Appl. No.: 13/577,639

(22) PCT Filed: Feb. 8, 2011

(86) PCT No.: PCT/DK2011/050033
§ 371 (c)(1),
(2), (4) Date: Oct. 24, 2012

(87) PCT Pub. No.: WO2011/095175
PCT Pub. Date: Aug. 11, 2011

(65) Prior Publication Data
US 2013/0039725 A1    Feb. 14, 2013

Related U.S. Application Data

(60) Provisional application No. 61/303,390, filed on Feb. 11, 2010.

(30) Foreign Application Priority Data

Feb. 8, 2010 (DK) ................................ 2010 00108

(51) Int. Cl.
*B65G 47/86* (2006.01)
*G01B 5/00* (2006.01)
*B65G 47/84* (2006.01)

(52) U.S. Cl.
CPC ............ *G01B 5/0002* (2013.01); *B65G 47/846* (2013.01); *B65G 47/847* (2013.01)

(58) Field of Classification Search
CPC .... B65G 47/84; B65G 47/846; B65G 47/847; B65G 47/848; B65G 49/061; B65G 49/067; G01B 5/0002; G01B 5/0004; G01B 5/0007; G01B 5/0009
USPC ........ 356/601, 602, 614; 414/222.01, 222.03, 414/222.04, 222.07; 700/98, 213, 259, 303; 198/474.1, 475.1
See application file for complete search history.

(56) References Cited

U.S. PATENT DOCUMENTS 1,106,884 A * 8/1914 Miller .......................... 198/480.1
1,112,155 A * 9/1914 Muench ..................... 198/480.1

(Continued)

FOREIGN PATENT DOCUMENTS

DE    39 10 388 C1    8/1990
DE    42 36 135 A1    4/1994

(Continued)

OTHER PUBLICATIONS

Erzeugung von CAD-Datensatzen fur Inlays and Kronen mit funktionellen Kauflachen, A. Mehl, Dtsch Zahnarztl Z 52 (1997), pp. 520-524. See English summary, and the first sentence on p. 521 states "The stone replica with the preparation that is to be scanned is mounted in a clamping device."

(Continued)

*Primary Examiner* — Ernesto Suarez
*Assistant Examiner* — Brendan Tighe
(74) *Attorney, Agent, or Firm* — Buchanan Ingersoll & Rooney PC

(57) ABSTRACT

Disclosed is an object feeder system configured for arrangement in a three dimensional scanner, the system comprising: an object feeder scanning plate assembly comprising a number of tracks, wherein each track adapted to hold at least one object holder, wherein said tracks are configured to extend within the plate assembly from a parking area towards a scanning area, and where each object holder is configured for retaining an object to be scanned in the scanner for obtaining a three dimensional representation of the object, and wherein the object feeder system further comprises means for moving the at least one object holder in the at least one track.

17 Claims, 11 Drawing Sheets

(56) References Cited

U.S. PATENT DOCUMENTS

| | | | |
|---|---|---|---|
| 1,124,145 A | * | 1/1915 | Koepp .................... 198/473.1 |
| 5,424,836 A | | 6/1995 | Weise et al. |
| 2012/0136476 A1 | * | 5/2012 | Baccini et al. ............. 700/213 |

FOREIGN PATENT DOCUMENTS

| | | |
|---|---|---|
| DE | 198 41 393 A1 | 3/2000 |
| EP | 0 572 798 A2 | 12/1993 |
| EP | 1 076 237 A2 | 2/2001 |

OTHER PUBLICATIONS

International Search Report (PCT/ISA/210) issued on May 20, 2011, by the European Patent Office as the International Searching Authority for International Application No. PCT/DK2011/050033.

* cited by examiner

603

OBJECT FEEDER SYSTEM

FIELD OF THE INVENTION

This invention generally relates to an object feeder system adapted to be arranged in a three dimensional (3D) scanner. More particularly, the invention relates to an object feeder scanning plate assembly comprising at least one track adapted to hold at least one object holder, where the at least one object holder is configured for retaining an object to be scanned in the scanner for obtaining a three dimensional representation of the object. The three dimensional representation of the object may comprise the surface of the object.

BACKGROUND OF THE INVENTION

Systems for three-dimensional optical scanning are well known in the prior art. They typically comprise one or more light sources projecting a structured light pattern on the object to be scanned, one or more cameras and data processing equipment to convert the recorded image co-ordinates to three dimensional co-ordinates using state of the art software. Usually, only a part of the object is scanned in a single scan. To create a full scan of the object, camera and light source need to be moved relative to each other.

Precision is of utmost importance in many applications, e.g. when the scan data is used to model an object, which must fit precisely into another part. Such applications are e.g. devices for the ear canal such as hearing aids, dental implants and other prostheses for the body. For hearing aid shells sub-millimeter precision is required or the shell will cause irritation, acoustic feedback and possibly infection to the epidermis of the ear canal. For dental implants the precision requirement is even greater, since a human being can detect differences less than 1/10 of a millimeter when biting. Therefore systematic or random errors in the calibration and/or performance of scanners for these uses can be critical. This has hitherto limited the use of scanning in the modeling of such implants and shells.

When scanning an object in a three-dimensional scanner, the object can be placed on a plate, platform, holding device, clamping device etc. in the scanner.

The article "Erzeugung von CAD-Datensätzen für Inlays and Kronen" by Mehl et al. in "Deutsche Zahnärtzliche Zeitschrift, 52. Jahrgang" discloses a clamping device for securing teeth preparations to be scanned in a 3D scanner. The preparations is taken from a sectioned gypsum model of a teeth set of a patient.

It remains a problem to provide an object feeder where the objects can be scanned easily, effectively and reliably.

SUMMARY

Disclosed is an object feeder system configured for arrangement in a three dimensional scanner, the system comprising:
an object feeder scanning plate assembly comprising a number of tracks, wherein each track is adapted to hold at least one object holder, wherein said tracks are configured to extend within the plate assembly from a parking area towards a scanning area, and where each object holder is configured for retaining an object to be scanned in the scanner for obtaining a three dimensional representation of the object; and
means for moving the at least one object holder in its track.

Disclosed is an object feeder system configured for arrangement in a three dimensional scanner, the system comprising:
an object feeder scanning plate assembly comprising a least one track adapted to hold at least one object holder, where the at least one object holder is configured for retaining an object to be scanned in the scanner for obtaining a three dimensional representation of the surface of the object, and wherein the object feeder system further comprises:
means for moving the object holders in the at least one track.

Disclosed is an object feeder system configured for arrangement in a three dimensional scanner, the system comprising:
an object feeder scanning plate assembly comprising a number of object holders arranged to be movably held in at least one track, said at least one track being configured to extend within the plate assembly from a parking area towards a scanning area, where each object holder is configured for retaining an object to be scanned in the scanner for obtaining a three dimensional representation of the object, and
means for moving the object holders in the at least one track.

In one embodiment, the three dimensional representation of the object comprises a three dimensional representation of the surface of the object.

The number of object holders may be arranged in the same or in different tracks.

In one embodiment, said number of object holders are arranged in two or more tracks, such as with one object holder per track in a plate assembly comprising a number of tracks.

In one embodiment, a number of object holders, such as two or more object holders, are arranged in one track.

In one embodiment, the means for moving the object holders is capable of moving the object holders between said parking area and said scanning area.

The means for moving the object holders may be a movement device capable of moving the object holders in the one or more tracks of the plate assembly.

Movement of the object holders between said parking area and said scanning area may be performed by moving the individual object holders one by one.

The track or tracks of the plate assembly may extend throughout at least a part of said parking area and/or throughout at least a part of said scanning area In may be advantageous that the plate assembly can hold a number of object holders in the at least one track. This may make it easy and fast to place one object in each holder, and then, if the plate is not already in the scanner, place the plate comprising the holders in the scanner, and perform the scanning, such that the object holders will be moved successively from their position in the parking area to the scanning area of the plate assembly whereby scanning of each object can be performed in the scanning region of the scanner.

When the plate assembly is arranged in a 3D scanner, the scanning area of the plate assembly may be arranged in the scanning region of the 3D scanner, whereby the quality of the scan of each object arranged in the scanning area of the plate assembly is the best possible. That is, when positioned in the 3D scanner, the plate assembly may be arranged such that the scanning area is at the location where optimal scanning results are provided and the scanning area of the plate assembly is a location within the plate assembly that provides optimal focus and the optimal scanning results. When the plate assembly is positioned in the 3D scanner, the parking area may be located outside the scanning region of the 3D scanner.

When a number of objects are to be scanned, it may be an advantage that the objects are arranged in a number of object holders and that the object holders can be moved into the scanning region of a 3D scanner one at a time. It may thus be an advantage that there exist one or more tracks for holding and guiding one or more object holders and means for moving the object holders since thereby the objects holders can be moved easily and efficiently in the tracks, such that each object to be scanned can be moved into the optical focus. When there is a number of objects to be scanned, the object holders can be moved into the region of the scanner exhibiting optimal optical focus one at a time such that each of the objects is scanned in the best possible position whereby the quality of the scan of each object is the best possible. Thus it is an advantage that each object holder subsequently can be moved into the position of the plate where the optical focus is best relative to the scanning means of the 3D scanner. Before scanning, the object holders can stand in their waiting positions in the parking area and each object holder is then moved into the scanning area one at a time.

As used throughout this specification and in the claims, the phrase "an object holder standing in its waiting position" may be interchangeable with the phrase "the object holder being positioned in the parking area"

The parking area may be located at an outer edge of the plate assembly, such that at least a part of the track extends along the outer edge of the plate assembly.

In the context of the present invention, the phrase "the outer edge of the plate" may refer to a position on the plate which is closer to the circumference of the plate assembly than the scanning area of the plate. A position at the outer edge may be closer to the circumference of the plate than a position in the center of the plate.

In some embodiments, the scanning area of the scanning plate assembly is arranged substantially in the center of the plate assembly. The scanning area may also be located closer to the circumference than to the center of the plate assembly.

The means for moving the object holders may be capable of automatically moving the object holders, such that the object holders may be moved between the parking area and the scanning area without user interaction.

At least a part of the surface of the plate at which the object holders are arranged may be substantially planar defining a planar surface. In the context of the present invention, said surface may be considered to be substantially planar also when recesses are formed in the plate to be e.g. part of a track.

The parking area may be arranged closer to the edge than to the center of said planar surface. The scanning area may be arranged closer to the center than to the edge of said planar surface.

In the context of this application, the term "track" may refer to any controlled guideway or path connecting a parking area and scanning area. The track may comprise one or more rails, recesses, linkage units, and/or a combination of these.

In the context of this application, the term "scanning" may relate to any technique for scanning an object, such as contact or non-contact based techniques. Contact based techniques may comprise a direct contact between a probe and the object to be scanned, such as scanning probe microscopy techniques. Non-contact based methods may comprise an imaging of the object to be scanned using acoustic waves or electromagnetic waves, such as visible light, infrared light, X-rays, or microwaves. Light may be laser light, white light etc.

It may be advantageous that the plate can hold a number of object holders in its parking area, because it makes it easy and fast to place one object in each holder, and then, if the plate is not already in the scanner, place the plate comprising the holders in the scanner, and perform the scanning, whereby the object holders will be moved successively from their parking area to the scanning area whereby scanning of each object can be performed in the scanning region of the 3D scanner.

It may be advantageous that the plate can hold a number of holders in its outer edge, because it makes it easy and fast to place one object in each holder, and then, if the plate is not already in the scanner, place the plate comprising the holders in the scanner, and perform the scanning, whereby the object holders will be moved successively from their outer edge position to the centre whereby scanning of each object can be performed in the optical focus of the scanner.

It is an advantage that since a number of objects may be arranged on the plate, the user or operator, for example a dental technician, shall not carry out the step of inserting each object holder in the scanning region of the scanner one at a time. Furthermore, the risk of mistakes and errors are reduced or even maybe completely avoided because the process of scanning the objects is automated and because the amount of human interference is reduced.

Since the means for moving, such as the movement device, are capable of moving the objects holders, the user or operator does not need to sit by the scanner and manually move each object holder into the scanning region of the 3D scanner one at a time. When the object feeder system is controlled by means in the 3D scanner, which performs the movement of the object holders, the operator, for example a dental technician, is free to perform other tasks, whereby the scanning of the objects becomes easy and efficient for the dental technician.

Thus the complete scanning process of scanning a number of objects according to the above makes the scanning fast and reliable.

The means in the 3D scanner for controlling the object feeder system may be software, hardware, firmware etc.

As an example of implementation, the tracks and object holders may be arranged on a swinging axis and a rotation axis, and the scanning area may then be arranged to be in the centre of the plate, whereby absolute errors are reduced because errors and uncertainties are smaller in the centre of the axes' than outside the centre, e.g. on an outer edge of the system, because of the magnitude of the absolute error at a given distance from an axis.

The objects may be dies from a sectioned teeth model, impressions of ear canals for personal fit hearing devices, objects to be scanned for quality control etc.

One or more objects may be arranged in one or more of the object holders. E.g. one object can be arranged in each object holder, or there can be arranged one object in every second object holder, for example if the objects are large, or there can be arranged two or more objects in one object holder etc.

When scanning dies from a teeth model, the dies may come from the same model or from different models.

In some embodiments the object feeder system comprises a number of tracks where each track is configured to extend from a parking area within the plate assembly towards a location within the plate assembly that is configured for providing optimal scanning results.

In some embodiments the object feeder system comprises a number of tracks where each track is configured to extend from a parking area within the plate assembly towards the scanning area.

In some embodiments, the scanning area of the scanning plate assembly is arranged substantially in the centre of the plate assembly. The scanning area may also be located closer to the circumference than to the center of the plate assembly.

In some embodiments, the location within the plate assembly configured for providing optimal scanning results is at the centre of the plate assembly.

In some embodiments, the parking area is located at one portion of the circumference of the plate assembly while the scanning area is located at another portion of the circumference. This may e.g. be the case when the object feeder system is based on a configuration utilizing epicyclic gearing.

In embodiments, where the scanning area is arranged to be in the center of the scanning plate assembly it may be an advantage for the tracks to run from a parking area at the outer edge of the plate assembly towards the scanning area in the center of the plate assembly, because then the object holders can be moved into the scanning area of the plate assembly one at a time for scanning.

When the scanning area is located in the centre of the plate assembly and the parking area is arranged at the outer edge of the of the plate assembly, it may be an advantage for the tracks to run from the outer edge of the plate assembly towards the centre of the plate assembly, because then the object holders can be moved into the centre of the plate assembly one at a time for scanning, since the optical focus is commonly arranged to be in the centre of the plate assembly. Alternative and/or additionally the object feeder system comprises a scanning track which runs into scanning area (e.g. in the centre of the plate assembly) for placing objects to be scanned and a waiting track for all the other object holders which are waiting to be scanned or which have been scanned already. The waiting track may be positioned in the parking area of the plate assembly.

In some embodiments the plate assembly comprises a fixture plate and a core plate arranged coaxially relative to each other, where the fixture plate has an opening/bore in its centre in which the core plate is arranged. The core plate and the fixture plate may be arranged such that they together define a substantially planar surface of the plate.

It is an advantage that due to this arrangement, the fixture plate and the core plate can move relative to each other. When the fixture plate and the core define a substantially planar surface of the plate, the core plate and the fixture plate may be rotated relative to each other around the normal vector to this planar surface.

In some embodiments, the fixture plate comprises an parking area track portion of each of the tracks, and the core plate comprises one scanning area track portion, which is configured to align with each of the parking area track portions in turn, such that one complete track from the parking area of the plate assembly to the scanning area of the plate assembly can be arranged at a time. This may have the advantage that hereby one object holder can be moved into and positioned in the scanning area of the plate at a time. In one embodiment the parking area is located on the fixture plate while the scanning area is located on the core plate. In one embodiment the parking area is located on the core plate while the scanning area is located on the fixture plate.

In some embodiments the fixture plate comprises an outer track portion of each of the tracks.

In some embodiments the core plate comprises one inner track portion, which is configured to align with each of the outer track portions in turn, such that one complete track from the outer edge of the plate assembly to the centre of the plate assembly can be arranged at a time.

It may be an advantage that hereby one object holder can be moved into and positioned in the centre of the plate at a time.

In some embodiments the object feeder scanning plate assembly further comprises a base plate arranged as a base for both the fixture plate and the core plate, and where the base plate is adapted to be mounted on an axis in a 3D scanner, such that the plate assembly may be rotated relative to a detection system of the 3D scanner.

It may be advantageous to have a base plate since then the fixture plate and the core plate can move relative to each other while the plate assembly can be mounted on an axis inside the 3D scanner.

In some embodiments the core plate is adapted to be fixedly attached to the base plate, and where the fixture plate is adapted to be rotatable attached relative to the base plate and the core plate, such that the fixture plate can rotate relative to the core plate and the base plate.

In some embodiments the base plate is configured to be arranged on a rotatable foot in the scanner. The rotatable foot may be arranged on the swinging axis of the 3D scanner, such that a combined movement of the rotatable foot and the swinging axis allows for an arbitrary orientation of the object holder relative to the detection system of the 3D scanner.

In some embodiments an object holder arranged in the centre of the core plate is configured to be rotated by means of rotation of the foot in the scanner. The rotation may be around a normal vector of the plate assembly. The means of rotation may comprise a rotation device capable of rotating the foot in relative to said a normal vector of the plate assembly It may be an advantage that the object holder can be rotated relative to the detection system of a 3D scanner so that an object in the object holder can be scanned from all of its sides.

The object may be rotated by means of the object holder, which is rotated by means of the core plate, which is rotated by means of the base plate, which is rotated by means of the foot in the scanner. The rotation may be around the normal vector of the plate assembly.

When the core plate is rotating, the fixture plate can be secured in position by a locking means, such as an arm for locking the fixture plate or any other suitable locking means known to the skilled person.

In some embodiments, the plate assembly comprises an intermediate ring arranged between the base plate and the fixture plate. The intermediate ring may be formed to reduce friction between the base plate and the core plate in the plate assembly, such that when the fixture plate rotates e.g. during the procedure to exchange the object holder in the scanning area with an object holder in the parking area, the rotation is made with less effort. The intermediate ring may comprise a ferromagnetic material.

In some embodiments each outer track portion in the fixture plate comprises a recess on the side of the fixture plate facing the base plate.

In some embodiments the inner track portion in the core plate comprises a recess on the side of the core plate facing the base plate.

In some embodiments the base plate comprises a magnet.

In some embodiments the base plate comprises a permanent magnet.

It may be advantageous to have a magnet e.g. in the centre of the base plate, since hereby an object holder which is magnetic in its bottom can be retained in the centre of the plate assembly, when the object feeder system is moved inside the scanner. The magnet may comprise a permanent magnet or an electromagnet. In some embodiments the use of an electromagnet may be advantageous since the force exerted on the object holder may result in a friction which may be avoided or reduced when the electromagnet is turned off while the object holder is moved to/from the scanning area from/to the parking area In some embodiments, the object holders are secured in the one or more tracks of the plate assembly, so that the object holders cannot be removed from the tracks and thereby from the plate assembly, when the plate assembly and the object holders are assembled and configured for normal use.

It may be advantageous that the object holders cannot be removed from the tracks, because when the object feeder system is tested or calibrated, it will always be with all the object holders on the plate and not just with some of the holders, and therefore the test or calibration will always be performed with the correct weight of the object feeder system. Furthermore, the probability that errors occur in the system is greatly reduced, when the object holders are secured to the plate.

It may further be advantageous that when the object holders cannot be removed from the tracks, it is easy for user or operator to ensure that the holders are not placed wrongly on the plate assembly, and the object holders are under control and easy to keep track of, so that they will not be lost the next time scanning is performed.

Alternatively, the object holders can be removed from the plate assembly, i.e. the object holders are not fixedly secured to the tracks, but can be taken out of the tracks easily. The object holders may then have features such that they are retained at the plate assembly and do not fall off, when the plate assembly is moved in the scanner. These features may be magnets, such as permanent magnets and/or electromagnets.

In some embodiments, each object holder comprises an object holder bottom and an object holder top.

In some embodiments each object holder bottom comprises a flange adapted to fit into the respective recess in its track in the plate assembly.

It may be an advantage that the object holders each have a flange which fits into the recess of each track, since hereby the object holder can move while still being secured to the plate assembly.

In some embodiments the width of each track is larger than the width of a flange in each object holder, so that each object holder is configured to move with a slack in its respective track In some embodiments the width of each track is larger than the width of the flange of the bottom of each object holder, so that each object holder is configured to move with a slack in its respective track.

The phrases "bottom" and "top" are only used for illustrative purposes. In principle, the plate assembly and the object holders may be oriented arbitrarily, and the bottom of an item is not necessarily arranged closer to the ground than the top of this item. Further, during part of a 3D scan an object holder may be oriented horizontally, with top and bottom having the same distance to the ground.

It may be an advantage that the object holders can move with slack in their respective tracks, because hereby it is easy to move the object holders in contrast to if the object holders moved very tightly, because then there is a risk that the object holders may get stuck in the tracks. Furthermore, the slack enables for less strict demands on accuracy in production of the parts in the system.

Some scanning procedures involve analysis or scanning the scanned object at two or more orientations relative to the detection system of the 3D scanner in order to obtain a 3D representation of the object. A change of orientation may be provided by rotating a swinging arm on which the scanning plate assembly is arranged relative to the detection system. A change of orientation may be provided by rotating at least a part of the plate assembly around a normal vector of the plate assembly. It may be preferred that none of the other objects or object holders blocks the line of sight between a scanned object and the parts of the detection system of the 3D scanner for all orientations of the plate assembly in the scanner during a scanning of that object.

The parts of the detection system of the 3D scanner may comprise a source, such as a light source, and a receiver. The receiver may comprise one or more camera(s) capable of detecting light from the source that has been reflected from the surface of said object. The source may be a broadband source, a narrow-band source, or a single-frequency source.

For instance in an optical 3D scanner, wherein light is projected onto the object to be imaged and the reflected light is recorded by one or more cameras, it may be advantageous that the object arranged in the object holder located in the scanning area can be viewed undisturbed over a solid angle, which is sufficiently large to provide visual access to the object from the angles required to allow for a 3D representation of the object. This may be obtained by having a sector on the plate assembly where there are no object holders during the scanning of a given object.

The sector which is free of object holders may be realized by a sector wherein no tracks are formed.

In some embodiments the plate assembly is adapted to comprise a number of object holders in such a manner that there remains a free space on the plate assembly, where there are no tracks and therefore never any object holders, such that there is visual access to the scanning area across the part of the plate where there are no tracks and object holders.

In one embodiment, the sector which is free of tracks is bounded by a first and a second line extending from the scanning area to the circumference of the plate assembly. The angle, alpha, between the first line and the second line may be at least 5°, such as at least about 10°, such as at least about 15°, such as at least about 20°, such as at least about 30°, such as at least about 45°, such as at least about 60°, such as at least about 75°, such as at least about 90°, such as at least about 105°, such as at least about 120°, such as at least about 150° such as at least about 180°. Within the angle alpha an object, such as a model of a tooth placed in an object holder located in the parking area, will not block the visual access to the object arranged in an object holder located in the scanning area even when the line of sight from e.g. a light source or a camera is parallel to the surface of the plate assembly.

The free space area on the plate assembly may also be realized by arranging the object holders located in the parking area in such a manner that no object holders are located in the free space during a scanning, such that there is visual access to the scanning area of the plate assembly across that part of the plate. Between scanning different objects, the object holders may move into the free space, but during each scanning, the free space is free of object holders, or at least free of object holders retaining an object.

In one embodiment, objects in a number of object holders are scanned. Below an upper limit defined by the physical dimensions of the 3D scanner, of the object holders and of the objects to be scanned, this number may in principle be any integer number, such as an integer number in the range of 1 to 24, such as 2, 3, 4, 5, 6, 8, 10, or 12 objects. If the number of object holder is for example 6, this allows for an efficient scanning sequence for many cases in the dental industry.

In one embodiment, a number of objects are scanned. Below an upper limit defined by the physical dimensions of the 3D scanner, of the object holders and of the objects to be scanned, this number may in principle be any integer number, such as an integer number in the range of 1 to 24, such as 2, 3, 4, 5, 6, 8, 10, or 12 objects. The number of objects that can be arranged in the object holders of the plate assembly may also be larger than 24, such as larger than 50, such as larger than 100, such as larger than 200, such as larger than 500, such as larger than 1000.

In some embodiments the object holders are made of a magnetic material. It may be an advantage that the object holders are made of a magnetic material, because then the holders can be dragged or pulled out of the scanning area to a waiting position in the parking area when the means for moving the object holders, such as a movement device, comprises a magnetic component, e.g. an electromagnet.

Alternatively and/or additionally the object holders can be dragged or pulled by means of a mechanical fixation, by means of friction, by means of gripping means such as hooks and/or the like.

The object holders may be dragged or pulled by a mechanical fixation device or by a gripping device, such a hook and/or the like.

Furthermore, it may be an advantage that the object holders are made of a magnetic material and/or comprise permanent magnets and/or electromagnets, because then the object holders do not move in the tracks when the plate assembly is moved, e.g. when the plate assembly is arranged on a swinging axis in the scanner, which performs swinging movements as part of a scanning procedure.

In some embodiments the means for moving the object holders, such as a movement device comprises an object feeder arm assembly.

It may be an advantage that the means for moving, such as a movement device, comprises an arm assembly, since the arm assembly can approach the object holders from the side and/or from above when the system is arranged in the scanner, and the arm assembly has free space to move around in order to move the object holders.

Alternatively and/or additionally, the means for moving the object holders can be performed from below when the system is arranged in the scanner, e.g. the means for moving can be integrated in the plate assembly or the means for moving can be electrical motors arranged in the tracks or object holders etc.

Alternatively and/or additionally, the means for moving the object holders is capable of moving an object holder arranged on the opposite side of the plate assembly relative to the movement device when the system is arranged in the scanner, e.g. the means for moving can be integrated in the plate assembly or the means for moving can be one or more electrical motors arranged in the tracks or object holders etc. When the object holders are placed above the plate assembly, the means for moving may be arranged below the plate.

In some embodiments the object feeder arm assembly comprises a first arm configured for moving the object holders one at a time.

In some embodiments the first arm is adapted to contact one holder at the time and move it from the parking area into the scanning area of the plate assembly in the object holder's respective track.

In some embodiments the first arm comprises a head member comprising an electromagnet, which is adapted to be turned on when the first arm starts contacting an object holder to move it from the scanning area to the parking area of the plate assembly.

It may be an advantage that the head member of the first arm comprises an electromagnet, because when the electromagnet is turned on, the magnetic object holders can be dragged by the first arm due to magnetism.

In some embodiments the electromagnet is adapted to turn off, when the object holder has been moved to the parking area of the plate assembly.

It may be an advantage that when the electromagnet is turned off, there is no magnetic attraction between an object holder and the first arm, and the first arm is then free to move away from the object holder, e.g. to a next object holder.

In some embodiments the head member is flexibly attached to the first arm and adapted to move relative to the first arm, whereby establishing contact to the respective object holder is facilitated.

It may be an advantage that due to the flexibility of the head member, the head member will be able to create contact to an object holder, even though the contact conditions are not optimal, so the head member is allowed to be slightly off the optimal orthogonal position relative to the object holders.

In some embodiments the arm assembly further comprises a second arm configured for locking the fixture plate in a specific position.

It may be an advantage that the second arm can perform an extra locking of the fixture plate in case this is needed. This locking may be performed initially in a scanning sequence as a kind of calibration of position.

In some embodiments the first arm and the second arm are adapted to rotate relative to each other.

In some embodiments the object feeder system further comprises a base for the arm assembly adapted to be mounted in the scanner, where the arm assembly is adapted to be removable attached into the base.

In some embodiments the object feeder system further comprises at least one motor adapted to drive the movement of the object feeder plate assembly and of the object feeder arm assembly.

The motor may be arranged in the scanner and wires to/from the motor can be arranged, and the wires can be taken out of e.g. the base for the arm assembly, such that this base can be taken out of the scanner. The motor may also be arranged separately in the scanner.

The object feeder system may be configured for removable insertion into the scanner or it may be configured for permanent installation in the scanner.

The plate assembly may be substantially disc-shaped with a diameter of the plate assembly being in the range of about 1 cm to about 30 cm, such as in the range of about 2 cm to about 25 cm, such as in the range of about 3 cm to about 20 cm, such as in the range of about 4 cm to about 15 cm, such as in the range of about 6 cm to about 12 cm, such as about 10 cm.

The object holders may comprise an insertion surface which is configured to accept and retain an object. In one embodiment, the insertion surface is comprised within one side of the object holder. The object holders may in principle have any suitable shape, such as cylindrical, square, rectangular, or elongated triangular. The insertion surface on a cylindrical shaped object holder may be at one end face of the cylinder. The insertion surface may comprise an adhesive, such as blue tack adhesive or Plastilin, for retaining an object by adhesion.

In one embodiment, the plate assembly comprises identification tags arranged in relation to the object holders. Such identification tags may assist an operator when arranging the objects in their respective object holders. The identification tags may in principle be any marker which allows the operator to distinguish between the different positions on the scanning plate assembly, such as tags that may be read visually or e.g. with an electronic reader. Tags that can be read visually may comprise color codes, numerical codes, letter codes, or pattern codes. These codes may for instance be formed by dots defined in the plate. For instance, the number of dots may provide the means for distinguishing between the different object holders. The tags that may be read using an electronic reader may comprise a Radio-frequency identification (RFID) tag.

The largest dimension of the object holders may be below about 100 mm, such as below about 75 mm, such as below about 50 mm, such as below about 40 mm, such as below about 30 mm, such as below about 20 mm, such as below about 10 mm.

The diameter of a cylindrical object holder may be about 20 mm, and the height of a cylindrical object holder may be in the range of about 10 mm to 20 mm.

The present invention relates to different aspects including the object feeder system described above and in the following, and corresponding methods, devices, uses and/or products, each yielding one or more of the benefits and advantages described in connection with the first mentioned aspect, and each having one or more embodiments corresponding to the embodiments described in connection with the first mentioned aspect and/or disclosed in the appended claims.

In particular, disclosed herein is a three dimensional scanner configured for insertion of the object feeder system.

The three dimensional scanner may be a dental scanner, a scanner for scanning impressions of an ear for the manufacture of hearing devices, a scanner for quality control of manufactured objects, such as industrially manufactured objects, etc.

The three dimensional scanner may comprise
a detection system comprising
  a source arranged to emit a first signal towards a first region of the scanner, the path of said emitted signal defining a signal axis in said first region, the first region being configured to encompass the object feeder system according to the present invention;
  a receiver configured for receiving and detecting a second signal from said first region;
  a positioning system configured to support the object feeder system and to rotate at least part of said plate assembly around said signal axis and/or to tilt said plate assembly relative to said signal axis.

The detection system may use electromagnetic waves or acoustic waves to interrogate said object. The source of the detection system may comprise a source which emits acoustic waves or a source which emits electromagnetic waves, such as a light source emitting light in the visible range, such as laser light, white light, or in the infra-red range, an X-ray source, a micro wave source.

The second signal may be a reflection or diffraction of the first signal from the surface of the scanned object.

This may e.g. be the case when a source of a detection system is a laser source emitting a light signal onto the surface of the scanned object and the reflected signal is detected by one or more cameras comprised in a receiver.

The second signal may be a signal transmitted through the scanned object. This may be the case when an X-ray is used for scanning the object.

The receiver may comprise one or more detectors for detecting the second signal. The detector may comprise a detector for measuring acoustic waves, or a detector for detecting electromagnetic waves, e.g. light, such as a camera. The receiver may comprise two cameras arranged to provide stereo vision of the first region.

Due to optical limitations the optical focus may be best in a scanning region of said first region. When the object feeder system is inserted in the 3D scanner, the scanning area of the plate assembly may be located in the scanning region, where the optical focus is best. The whole or part of the scanning area of the plate assembly may be located substantially in the scanning region, where the optical focus is best. Evidently, minor variations in the location of the plate assembly relative to this optimum position are also covered by the scope of the present invention.

In one embodiment, the object holders are arranged on the plate assembly such that there is nothing obstructing the passage of the signal, such as light, from the source in the 3D scanner to an object in an object holder in the scanning area of the plate assembly, and nothing obstructing the passage of a signal, such as light, reflected from the object in the object holder in the scanning area to the receiver, such as one or more cameras. This may be true even when the plate assembly is tilted and/or rotated relative to the signal axis of the scanner.

The signal axis may be a straight line from the source to the object. The signal may also travel along a path having turns resulting from e.g. mirrors arranged in the path from the source to the object. In that case, the signal axis may be the defined by the path immediately before the emitted signal impinges on the object.

A scanning of an object may comprise several sub-scans taken with the scanned object arranged at different orientations relative to the detection system of a 3D scanner.

During the sub-scan, where data are recorded from the scanned object, the scanned object may be kept still relative to the detection system.

In one embodiment, each sub-scan in a scanning of an object comprises a linear translation of a signal over the scanned object. The signal may be provided by a source in a detection system.

The object holder may be rotated around the normal vector of the plate assembly at least between two sub-scans. The rotation may in principle be any arbitrary angle, such as 15°, 30°, 45°, 60°, 90° or 180°.

In some embodiments, the plate assembly is arranged in the scanner during at least one sub-scan, such that the normal vector of the plate assembly substantially coincides with the signal axis of the scanner.

The receiver and the positioning system of the 3D scanner may be implemented in various ways known to the skilled person.

The three dimensional scanner may also be based on contact probing of the objects and comprise a probe which can be brought into direct contact with the object.

In particular, disclosed herein is a computer-implemented method of controlling an object feeder system, where the object feeder system is configured for arrangement in a three dimensional scanner, and where the system comprises an object feeder scanning plate assembly comprising a least one track adapted to hold at least one object holder, where the at least one object holder is configured for retaining an object to be scanned in the scanner for obtaining a three dimensional representation of the surface of the object, and means for moving the object holder in the at least one track, where the method comprises the steps of:

moving the object holder into a location within the plate assembly configured for providing optimal scanning results by the means for moving;

scanning the surface of an object in the object holder by means of the three dimensional scanner;

moving the object holder out of the location configured for providing optimal scanning results, when scanning of the surface of the object in the object holder is performed, by the means for moving;

repeating the above steps as long as there is an object in an object holder which should be scanned.

In particular, disclosed herein is a computer-implemented method of controlling an object feeder system, where the object feeder system is configured for arrangement in a three dimensional scanner, and where the object feeder system comprises an object feeder scanning plate assembly comprising a number of tracks, wherein each track is adapted to hold at least one object holder, wherein said tracks are configured to extend within the plate assembly from a parking area towards a scanning area, and where each object holder is configured for retaining an object to be scanned in the scanner for obtaining a three dimensional representation of the of the object, and means for moving the object holder in its track, where the method comprises:

(a) moving an object holder into said scanning area on the plate assembly using said means for moving;
(b) scanning an object retained in the object holder by means of the three dimensional scanner;
(c) moving the object holder from the scanning area to the parking area of the plate assembly using said means for moving; and
(d) optionally repeating (a) to (c) for each object holder until the objects located therein are scanned.

In one embodiment, the means for moving the at least one object holder comprises a movement device capable of moving the object holders.

In particular, disclosed herein is a method of scanning a number of objects; where the method comprises:
providing a three dimensional scanner system comprising a three dimensional scanner and an object feeder system configured for arrangement in the three dimensional scanner, where the object feeder system comprises:
  an object feeder scanning plate assembly comprising a number of tracks, wherein each track is adapted to hold at least one object holder, wherein said tracks are configured to extend within the plate assembly from a parking area towards a scanning area, and where the object holders each are configured for retaining an object to be scanned in the scanner for obtaining a three dimensional representation of the of the object; and
  means for moving each object holder in its track;
arranging said objects in said object holders of said scanning plate assembly;
using computer controlled means for controlling said three dimensional scanner system and said object feeder scanning plate assembly such that for an object holder retaining an object to be scanned:
  (a) the object holder is moved into said scanning area on the plate assembly using said means for moving;
  (b) the object retained in the object holder is scanned by means of the three dimensional scanner; and
  (c) the object holder is moved to the parking area of the plate assembly using said means for moving when the scanning of the object is completed;
  (d) optionally repeating (a)-(c) for all object holders retaining an object to be scanned.

In one embodiment, the three dimensional representation of the object comprises the surface of the object.

Disclosed is also a computer program product comprising program code means for causing a data processing system to perform the method, when said program code means are executed on the data processing system; and a computer program product comprising a computer-readable medium having stored there on the program code means.

Disclosed is also a computer program product comprising program code for causing a data processing system to perform the method, when said program code is executed on the data processing system; and a computer program product comprising a computer-readable medium having stored there on the program code.

In one embodiment, said movement device comprises an epicyclic gearing system comprising one or more outer gears revolving about a central gear. An outer gear may revolve when the central gear is turned, such that an object holder connected to the outer gear rotates when the central gear is turned. The object holder may be arranged coaxially with the outer gear such that large displacement of an object arranged in the object holder from the rotation axis during a 360° rotation is avoided. This may allow the object to be rotated 360° with significant translation during this rotation.

Scanning an object in a 3D scanner for obtaining a three dimensional representation of the surface of the object can also be denoted 3D modeling, which is the process of developing a mathematical representation of the three-dimensional surface of the object via specialized software. The product is called a 3D model. A 3D model represents the 3D object using a collection of points in 3D space, connected by various geometric entities such as triangles, lines, curved surfaces, etc. The purpose of a 3D scanner is usually to create a point cloud of geometric samples on the surface of the object.

3D scanners collect distance information about surfaces within its field of view. The "picture" produced by a 3D scanner describes the distance to a surface at each point in the picture.

For most situations, a single scan will not produce a complete model of the object. Multiple scans, such as 5, 10, 12, 15, 20, 30, 40, 50, 60, 70, 80, 90 or in some cases even hundreds, from many different directions may be required to obtain information about all sides of the object. These scans are brought in a common reference system, a process that may be called alignment or registration, and then merged to create a complete model.

A triangulation 3D laser scanner uses laser light to probe the environment or object. A triangulation laser shines a laser on the object and exploits a camera to look for the location of the laser dot. Depending on how far away the laser strikes a surface, the laser dot appears at different places in the camera's field of view. This technique is called triangulation because the laser dot, the camera and the laser emitter form a triangle. A laser stripe, instead of a single laser dot, may be used and is then swept across the object to speed up the acquisition process.

Structured-light 3D scanners project a pattern of light on the object and look at the deformation of the pattern on the object. The pattern may be one dimensional or two dimensional. An example of a one dimensional pattern is a line. The line is projected onto the object using e.g. an LCD projector or a sweeping laser. A camera, offset slightly from the pattern projector, looks at the shape of the line and uses a technique similar to triangulation to calculate the distance of every point on the line. In the case of a single-line pattern, the line is swept across the field of view to gather distance information one strip at a time.

An example of a two-dimensional pattern is a grid or a line stripe pattern. A camera is used to look at the deformation of the pattern, and an algorithm is used to calculate the distance at each point in the pattern. Algorithms for multistripe laser triangulation may be used.

Disclosed is an object feeder system configured for successively loading objects into a recording region of a three dimensional analyzing device comprising a recording unit, said object feeder system comprising an object feeder scanning plate assembly and a movement device, where the scanning plate assembly comprises a number of object holders which are configured to be moved between a parking area and a recording area along at least one track, where each object holder is configured for retaining an object. The movement device is capable of automatically moving said object holders along said at least one track from said parking area to and from said recording area.

In the context of the present invention, the phrases "recording area" and "scanning area" may be used interchangeably to refer to the same part of the scanning plate assembly.

The recording unit of the three dimensional analyzing device may comprise a probe which analyzes the object using a contact-based method.

When the plate assembly is arranged in a three dimensional analyzing device, the recording area of the plate assembly may be arranged in the recording region of the three dimensional analyzing device, whereby the quality of the analysis or recording of each object arranged in the scanning area of the plate assembly is the best possible. That is, when positioned in the three dimensional analyzing device, the plate assembly may be arranged such that the recording area is at the location where optimal results are provided and the recording area of the plate assembly becomes a location within the plate assembly that provides optimal recording results. When the plate assembly is positioned in the three dimensional analyzing device, the parking area may be located outside the recording region of the three dimensional analyzing device. The recording region may e.g. be the region of a three dimensional analyzing device exhibiting optimal resolution and the recording area may be an area on said scanning plate assembly.

The scanning plate assembly comprises a sector that can be free of object holders, such that said recording device is allowed to obtain data from an object arranged in an object holder located in the recording area both when said plate assembly is perpendicular to said path and when the plate is tilted to be parallel to said path.

The movement device may be capable of automatically moving one, two or more object holders into said recording area at a time An analysis of an object may comprise several sub-analyses taken with the analyzed object arranged at different orientations relative to the recording device of a three dimensional analyzing device.

The analyzing device may comprise a scanning device, such as a 3D scanner, and said recording area comprises a scanning area of said 3D scanner. The recording device may comprise a device selected from the group of a camera system, comprising light source(s) and camera(s) or optical sensor(s), an X-ray detector, or a contact probe device.

The analyzing device may comprise a measurement device

BRIEF DESCRIPTION OF THE DRAWINGS

The above and/or additional objects, features and advantages of the present invention, will be further elucidated by the following illustrative and non-limiting detailed description of embodiments of the present invention, with reference to the appended drawings, wherein.

DETAILED DESCRIPTION

In the following description, reference is made to the accompanying figures, which show by way of illustration how the invention may be practiced.

Figure 1:
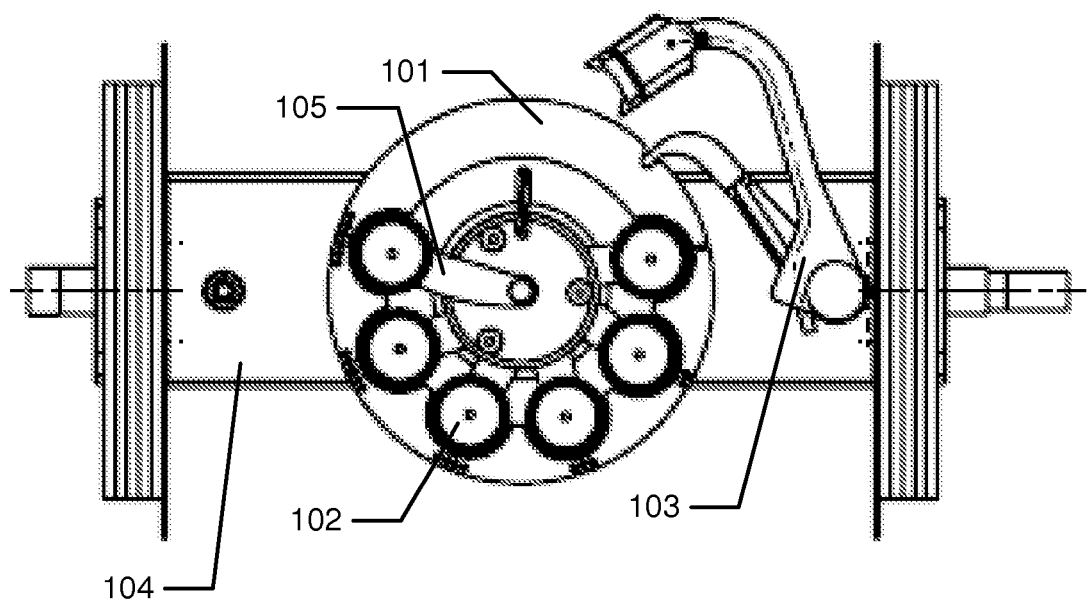
FIG. 1 shows an example of the object feeder system seen from above.

FIG. 1 shows an example of the object feeder system 100 seen from above. The object feeder system comprises a plate assembly 101 with object holders 102 mounted in tracks 105, and an arm assembly 103 for moving the object holders 102.

All object holders 102 are arranged in their respective tracks 105 in the outer edge of the plate assembly 101.

The object feeder system 100 is arranged on a swinging axis 104 in a scanner (not shown).

Due to the arrangement of the object holders 102 on the plate assembly 101 there is nothing obstructing the passage of emitted light from the light source in the scanner to an object in an object holder 102 in a scanning area in the centre of the plate assembly 101, and nothing obstructing the passage of light reflected from the object in the object holder 102 in the scanning area in the centre of the plate assembly 101 to the camera receiving and detecting the reflected light. When the plate assembly is positioned in a 3D scanner, its centre is arranged at the optical focus of the scanner.

Figure 2:
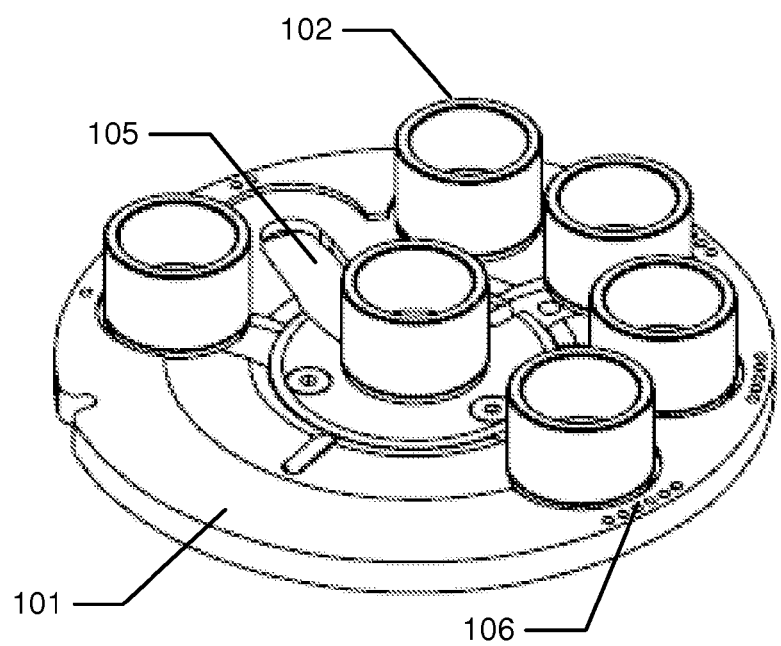
FIG. 2 shows an example of the plate assembly with object holders seen in perspective view.

FIG. 2 shows an example of the plate assembly with object holders seen in perspective view.

The object holders 102 are arranged in respective tracks 105 on the plate assembly 101. There are six object holders 102 and each track 105 is marked with a number of dots 106 on the plate assembly corresponding to the number of the object holder 102 in that track, i.e. object holder number one has one dot, object holder number two has two dots etc. up to object holder number six having six dots.

These dot numbers can help the user to place the place an object in the correct object holder defined by e.g. a CAD system on the user's pc.

Figure 3:
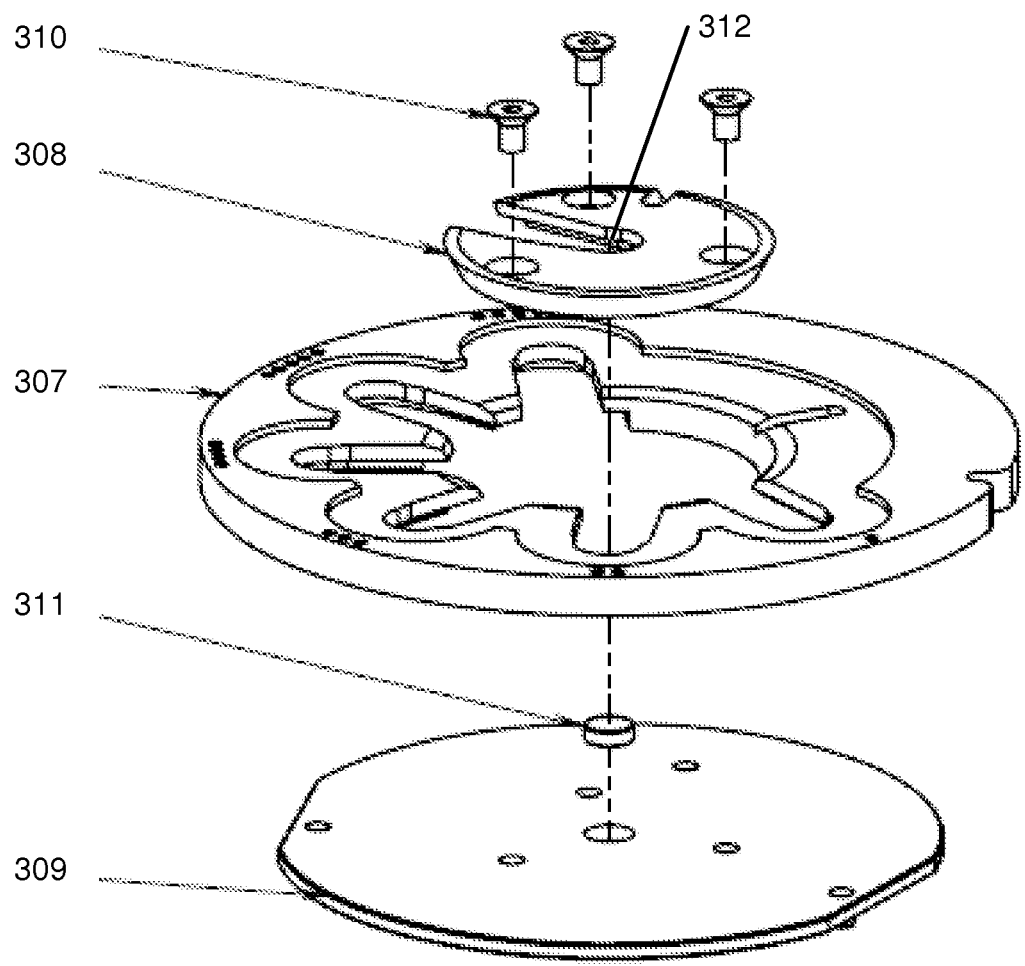
FIG. 3 shows an example of the plate assembly in an exploded view.

FIG. 3 shows an example of the plate assembly in an exploded view.

The plate assembly 301 comprises a fixture plate 307, a core plate 308 arranged in the centre of the fixture plate 307 and a base plate 309 onto which both the fixture plate 307 and the core plate 308 is arranged. The core plate 308 is fixed to the base plate 309 by fixing means, such as screws 310 extending through the core plate 308 to the base plate 309.

The fixture plate 307 can thus move relative to core plate 308 and the base plate 309. The outer rim of the core plate 308 is bevelled or has a recess such that the core plate 308 covers the inner rim of the fixture plate, whereby the fixture plate 307 is retained between the core plate 308 and the base plate 309.

A permanent magnet 311 is arranged in a hole in the centre of the base plate 309. The core plate 308 has a bore in its centre corresponding to this magnet 311 such that when an object holder is arranged in the centre of the plate assembly 301 on the core plate 308, there will be a magnetic attraction between the magnet 311 and the object holder, if the object holder is magnetic too. Hereby the object holder will be retained in the centre even though the plate assembly 301 or the entire object feeder system moves.

When an object holder is arranged in the centre of the plate assembly 301 it is in the scanning position. In order for an object in the object holder to be scanned from all sides, the core plate 308 on which the object holder is arranged, rotates, thereby rotating the object holder and the object.

The plates, 307, 308 and 309 in the plate assembly 301 can be made of metal, such as iron, or the plates can be made of a hard plastics or polymer material, such as Acrylonitrile Butadiene Styrene (ABS), which can be moulded, or Polyoxymethylene (POM), which can be milled or molded.

FIG. 4 shows an example of the tracks in the fixture plate and in the core plate.

Figure 4A:
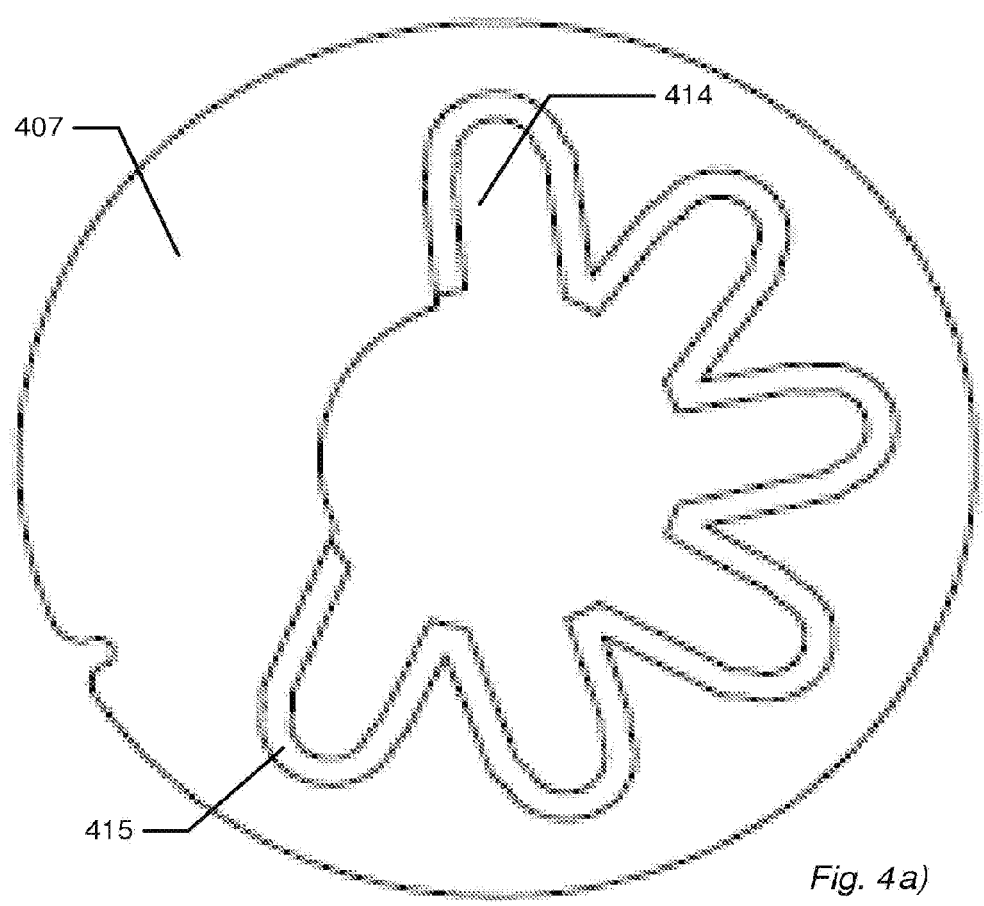
FIGS. 4a) and 4b) show examples of the tracks in the fixture plate and in the core plate.
Figure 4B:
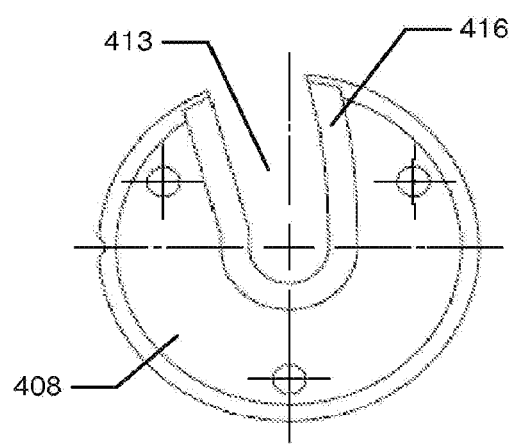

The fixture plate 407 in FIG. 4a) comprises the outer part or portion 414 of each of the tracks, and the core plate 408 in FIG. 4b) comprises the inner part or portion 413 of one track. When the plate assembly is assembled as seen in the previous figures, the core plate 408 is arranged in the centre of the fixture plate 407, and when the fixture plate 407 and the core plate 408 are rotated relative to each other, the fixture plate 407 can be arranged such that the inner part 413 of the one track in the core plate 408 is aligned with the outer part 414 of one of the tracks in the fixture plate 407, such that the object holder in the respective outer track part 414 can be moved all the way from the outer edge of the fixture plate 407 into the centre of the core plate 408, where it is scanned. When the object holder has been scanned, it is moved out from the centre of the plate assembly again, the fixture plate 407 turns relative to the core plate 408 such that another outer track portion 414 of the fixture plate 407 aligns with the inner track portion 413, such that the object holder in that outer track portion can be moved from the outer edge of the fixture plate 407 into the centre of the core plate 408. By turning the fixture plate 407 relative to the core plate 408 a complete track can be made by aligning the inner track portion 413 with one of the outer tracks portions 414 one at a time, so that all object holders can be moved into the centre of the core plate 408 one at a time to be scanned.

The core plate 408 comprises a recess 416 in the inner track portion 413 on the side facing the base plate, and the fixture plate 407 also comprises recesses 415 in the outer track portion 414 on the side facing the base plate. By means of these recesses 415, 416, object holders having a flange can fit into or under these recesses 415, 416, such that the object holders are secured in the tracks.

Figure 5A:
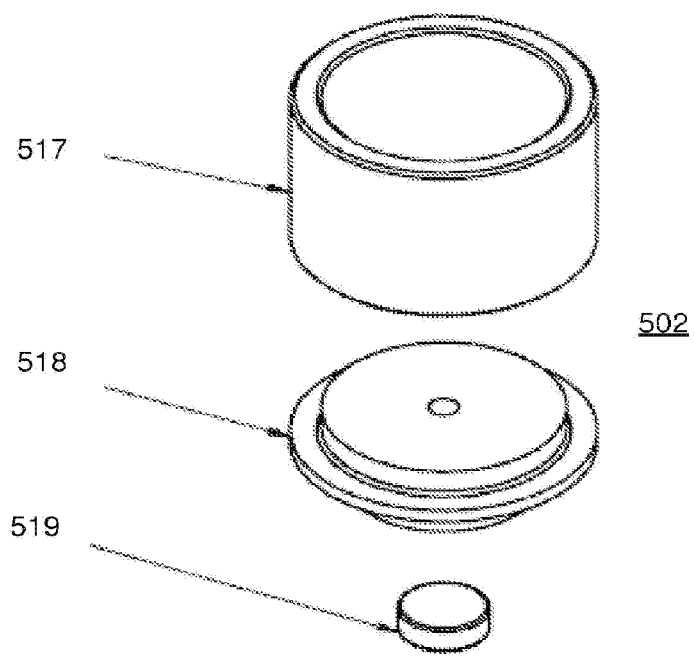
FIGS. 5a) and 5b) show examples of an object holder.

FIG. 5a) shows an example of an object holder in exploded view.

The object holder 502 comprises an object holder top 517 arranged on an object holder bottom 518. The top 517 is attached to the bottom 518 on a border on the bottom 518.

Figure 5B:
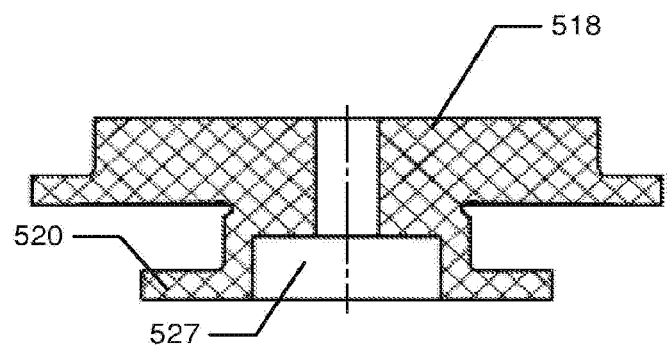

FIG. 5b) shows an example of the bottom in cross section view.

The bottom 518 comprises the border on which the top is resting, and a flange 520 configured for fitting into the recesses of the tracks as explained in connection with FIG. 4 above.

In FIG. 5a) a permanent magnet 519 is arranged in the bottom of the object holder bottom for ensuring that the object holder is secured to the plate assembly, such that the object holder will stay in its position in the track on the plate assembly unless the arm assembly moves the object holder.

In FIG. 5b) a space 527 in which the permanent magnet 519 can fit is seen. The permanent magnet 519 may be glued into the space 527.

The object holders 502 can be made of metal, such as iron, or the object holder can be made of a hard plastics or polymer material, such as Acrylonitrile Butadiene Styrene (ABS), which can be molded, or Polyoxymethylene (POM), which can be milled or molded.

Figure 6A:
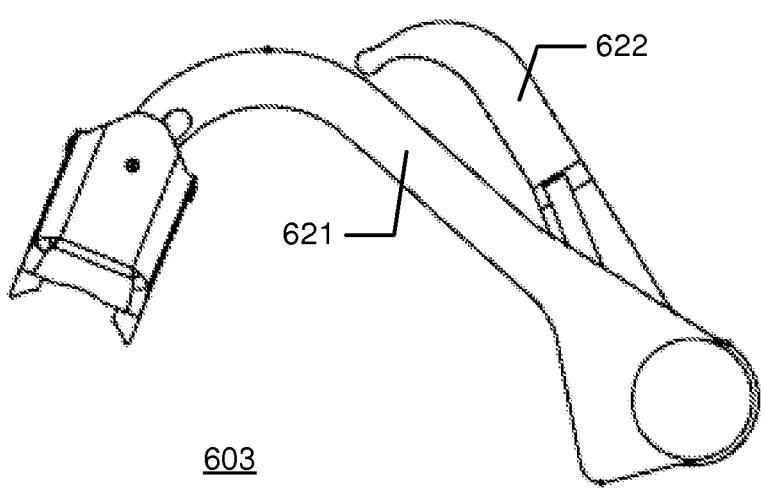
FIGS. 6a) and 6b) show examples of the arm assembly.

FIG. 6a) shows an example of the arm assembly seen from above.

The arm assembly 603 comprises a first arm 621 configured for moving the object holders one at a time and a second arm 622 configured for locking the plate assembly in a specific position.

The first arm and the second arm are adapted to rotate relative to each other.

Figure 6B:
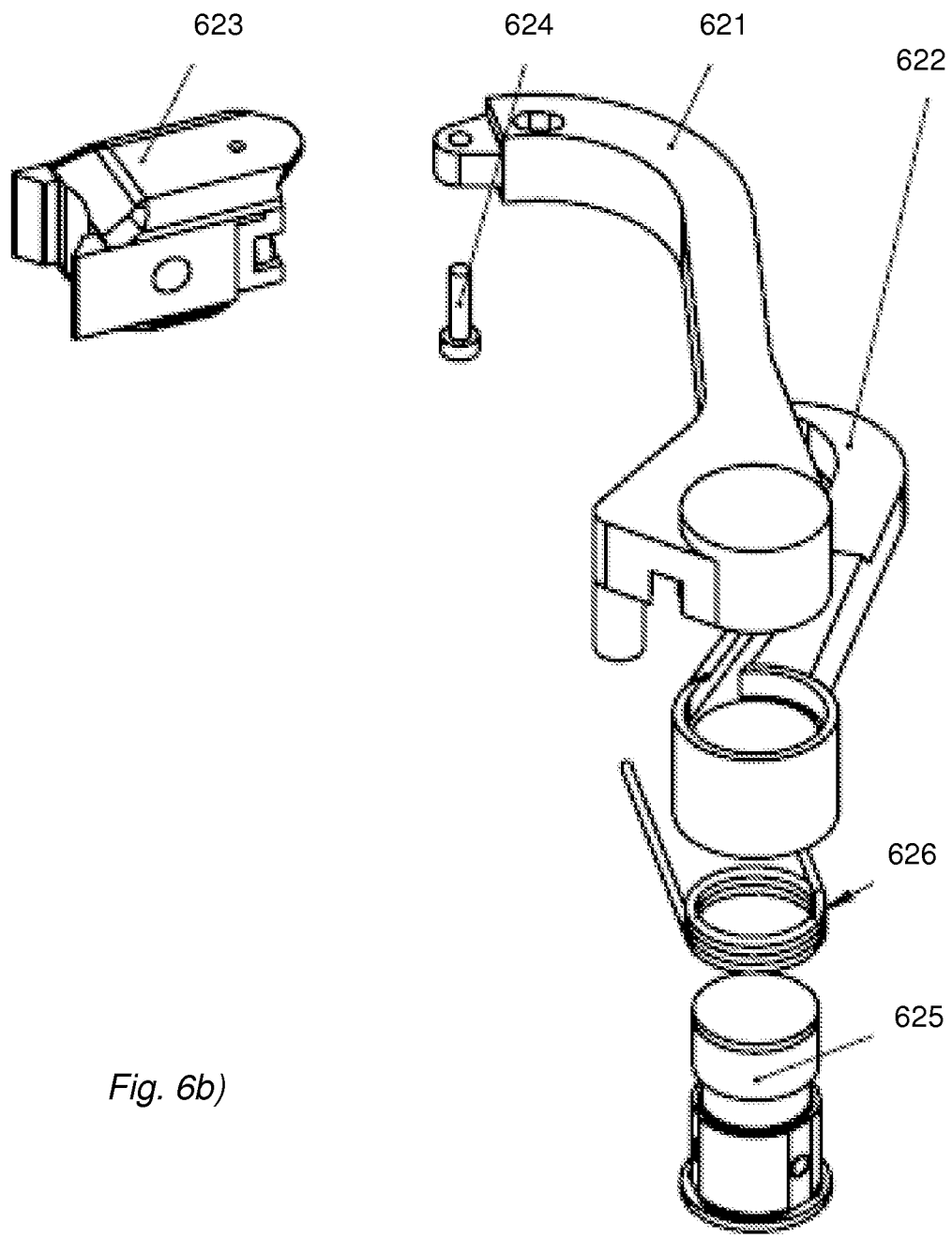

FIG. 6b) shows an example of the arm assembly in exploded view.

The first arm 621 comprises a head member 623 comprising a DC electromagnet, which is adapted to be turned on when the first arm 621 starts contacting an object holder to move it e.g. from the centre out to the outer edge of the plate assembly. The electromagnet is adapted to turn off, when the object holder has been moved to the outer edge of the plate assembly again. The head member 623 is flexibly attached to the first arm 621 and adapted to move relative to the first arm, whereby establishing contact to the respective object holder is facilitated. The head member 623 is attached to the first arm by means of a screw 624.

The arm assembly 603 is driven and thereby moved by a motor. The finished module contains a DC motor, a gearbox and control electronics hereunder a microprocessor and power transistor(s) as motor driver. The servo motor can be mounted in the swinging axis of the scanner and wires to connect the motor and the electromagnet can be arranged on or in the swing axis.

The DC electromagnet can be made by winding copper to form a solenoid around an H-shaped iron/steel core. The magnet can be powered by 24V DC when it should be on.

A light emitting diode (LED) can be present in the head member 623 for indicating that the electromotor is active when the light is on, and transient voltage suppression (TVS) protection diode can also be provided.

The LED can also be used as a communications means inside the scanner, for communicating to the scanner camera where the first arm is positioned. This can be used in case of errors in positioning the first arm or the arm assembly 603 relative to e.g. the plate assembly.

The first arm 621 and the second arm 622 are joined together in a base 625 which comprises a spring 626 enabling that the first arm 621 and the second arm 622 can move relative to each other with a spring-loaded tension.

FIG. 7 shows examples of different states of the object feeder system.

Figure 7F:
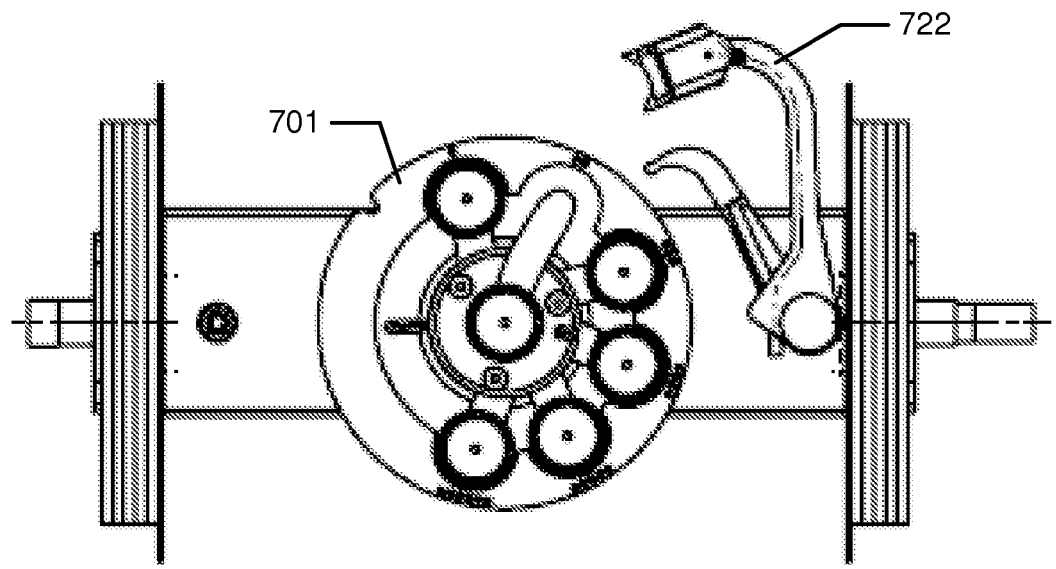
FIGS. 7a) through 7f) show examples of different states of the object feeder system.
Figure 7A:
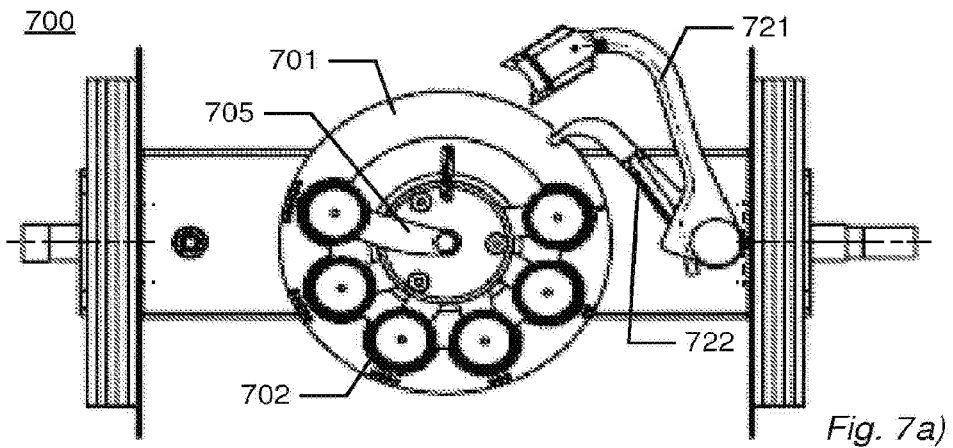

In FIG. 7a) the object feeder system 700 is in the start position. All object holders 702 are arranged in the outer edge of the plate assembly 701, ready to be moved into the centre of the plate assembly 701 one at a time by means of the first arm 721. The second arm 722 is in a lock position, locking the plate assembly 701 in position. The complete track 705 is made between the inner track portion of the core plate and the outer track portion in which object holder number six can move.

Figure 7B:
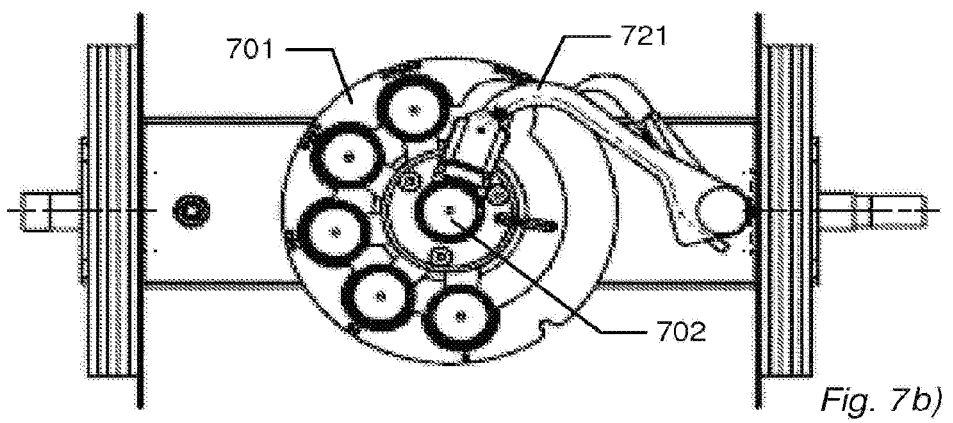

In FIG. 7b) the first arm 721 is contacting object holder number six in the scanning position in the centre of the plate 701. Either the object holder 702 has just been moved in there by the first arm 721, or the first arm 721 is about to move the object holder 702 out of there.

Figure 7C:
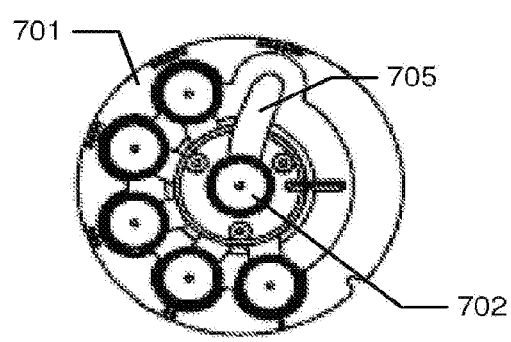

In FIG. 7c) the same situation as in FIG. 7b) is shown, but only the plate assembly 701 with the object holders 702 are shown and not the first arm 722 such that the complete track 705 in which object holder number six can move is shown.

Figure 7D:
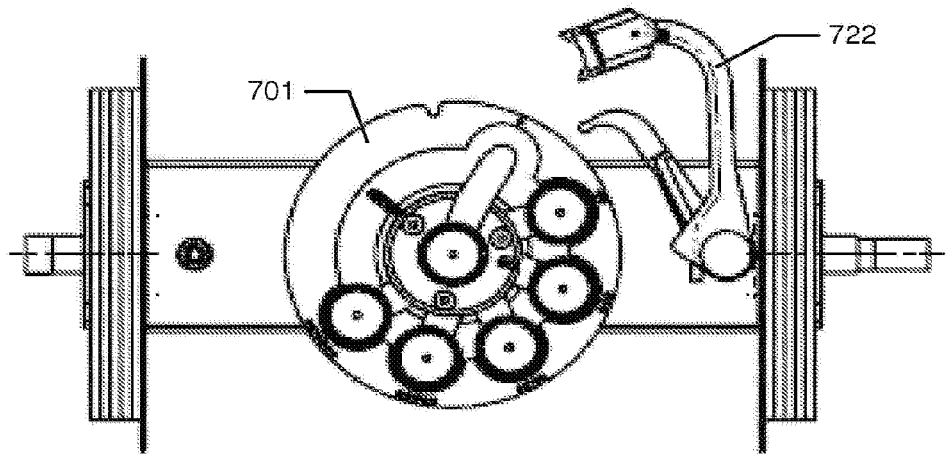

In FIG. 7d) object holder number one has been moved into the centre of the plate assembly 701 and the first arm 722 is away from the scanning area such that scanning can be performed.

Figure 7E:
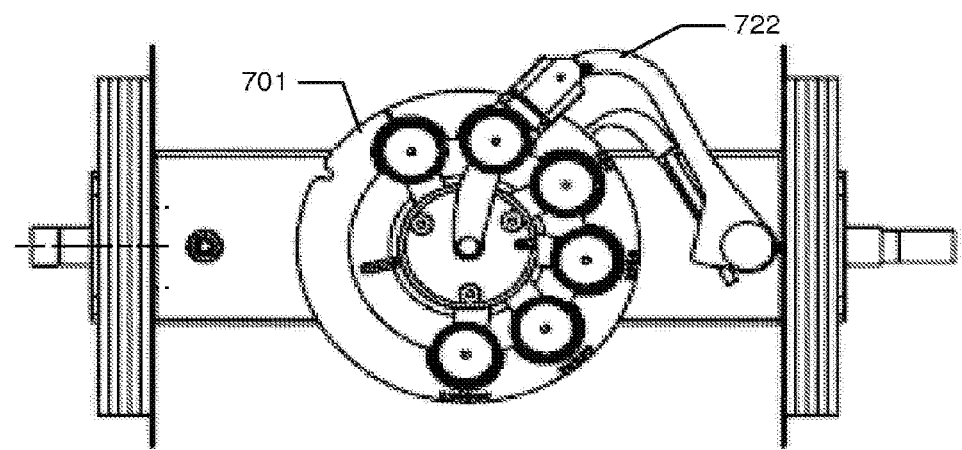

In FIG. 7e) object holder number two is contacted by the first arm 722 for being moved from the outer edge of the plate assembly 701 into the centre of the plate assembly 701.

In FIG. 7f) object holder number two has been moved into the centre of the plate assembly 701, and the first arm 722 is out of the scanning field, so that scanning of the object in object holder number two can be performed.

Figure 8:
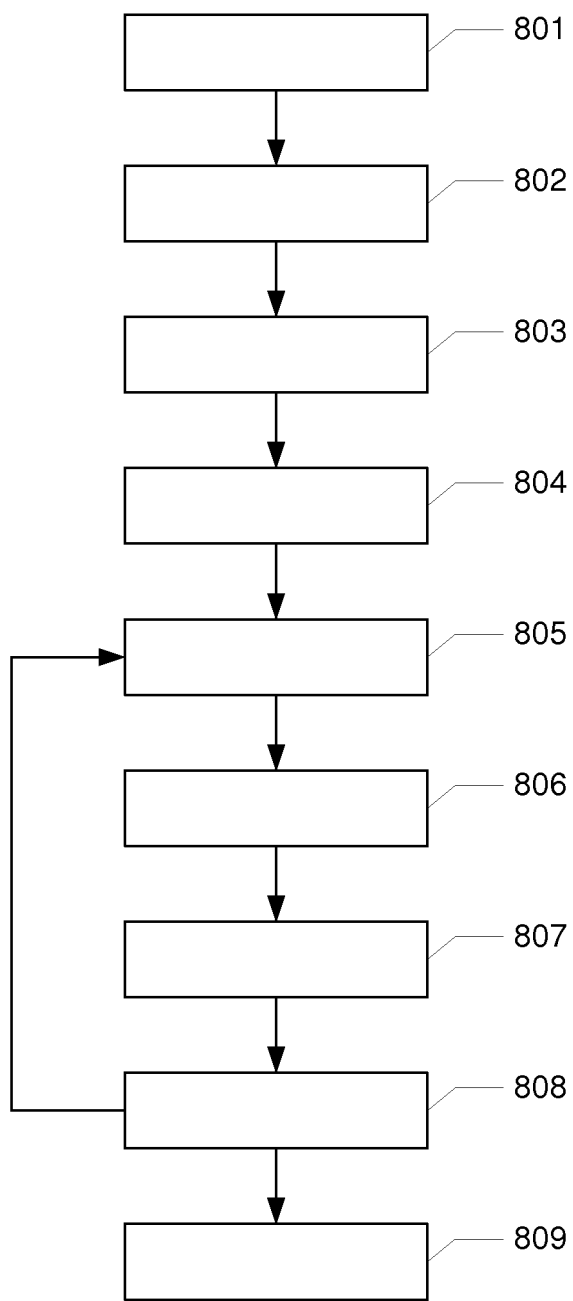
FIG. 8 shows a flow chart of an example of a method of how the object feeder system can be used for scanning objects.

FIG. 8 shows a flow chart of an example of a method of how the object feeder system can be used for scanning objects. In this example, the scanning area is located in the centre of the plate assembly.

In step 801 the objects to be scanned is selected and placed in the objects holders, which are placed in the parking area at the outer edge of the plate assembly. An adhesive, such as blue tack adhesive or Plastilin should be added in all object holders before placing objects in the object holder. The blue tack adhesive should only be placed flush with, or above, the top of the object holder, because blue tack adhesive on the sides of the object holders rings may prevent normal operation of the object feeder system.

In step 802 the object feeder system is arranged in the scanner, i.e. the plate assembly is placed on the swinging axis of the scanner and the arm assembly and the base for the arm assembly is also placed in the scanner and wires are connected to the motor for driving the electromagnet in the first arm. When in arranged in the scanner, the scanning area of the plate assembly is positioned in the scanning region of the scanner. The plate assembly should be placed in the scanner such that the six object holders in their respective tracks are pointing away from the scanner door since hereby the plate assembly and object holders are arranged correct relative to the optical system, so that none of the object holders shades for the scanning light. The scanner door is closed.

In step 803 the scanning sequence is initiated, and maybe a calibration is performed before the scanning sequence.

In step 804 first the track in the fixture plate on which object holder number one is placed, is aligned with the inner track in the core plate.

In step 805 the object holder is then pushed by the first arm into the centre of the plate assembly.

In step 806 scanning of the object(s) in object holder number one is then performed, e.g. by rotating the object holder such that the object can be scanned from different sides. The rotation is provided by rotating the core plate relative to the normal vector to the plate assembly.

In step 807 when the scanning of the object(s) in object holder number one is finished, the object holder is dragged out to the outer edge of the plate assembly by the first arm.

In step 808 the fixture plate now rotates such that the track in the fixture plate on which object holder number two is placed is aligned with the inner track in the core plate and steps 805-807 is repeated for the second object holder. Step 808 is subsequently repeated for all the remaining object holders.

In step 809 scanning of all objects are finished and the object feeder system can be taken out of the scanner again.

Figure 9:
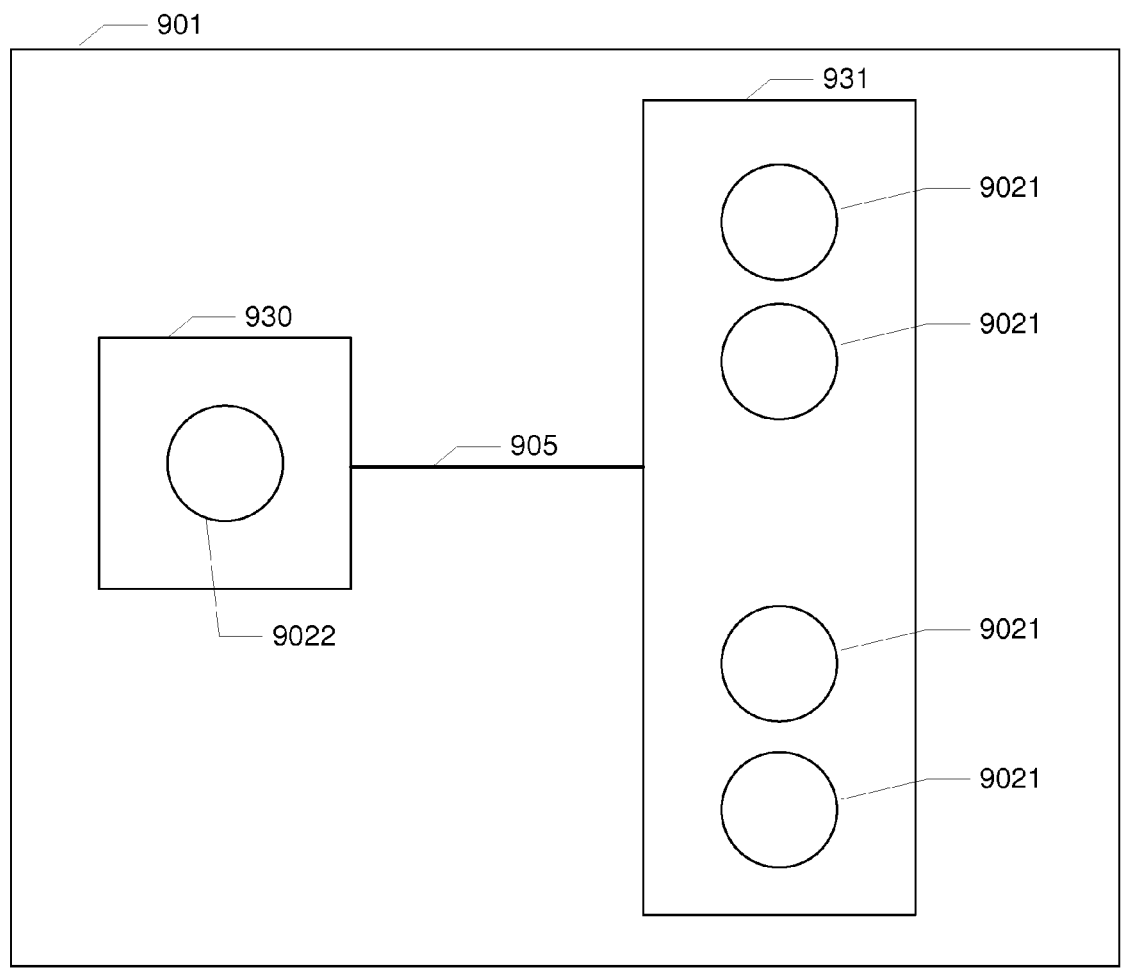
FIG. 9 shows a general schematic of an object feeder system according to the present invention.

FIG. 9 shows a schematic presentation of the scanning plate assembly 901. The plate assembly comprises a number of object holders 9021, 9022 of which one 9022 has been moved from the parking area 931 to the scanning area 930 along a track 905. The object holders may be moved between the parking area 931 and the scanning area 930 one by one, or in groups, such as such in groups consisting of two, three or even more object holders. For embodiments wherein electromagnetic radiation, such as light, is used to obtain a 3-dimensional representation of the objects, it may be preferred that only one object is scanned at a time to ensure visual access for the light source and camera system to the object when the object holder is rotated and tilted relative to the camera(s)/light source. For some embodiments, the visual access is not required and several objects may be scanned at a time. This may e.g. be the case when the scanning utilizes a probe, which is brought into direct contact with the object. The movement of the object holders between the scanning area 930 and the parking area may occur along one or more tracks 905. The scanning area 930 and the parking area 931 may in principle be arranged anywhere on the scanning plate assembly. For a 3-dimensional scanning of the objects, it may be preferred that the scanning area can be rotated and tilted relative to the camera(s)/light source of a 3-dimensional scanner without the scanning area being moved out of the scanning region of the scanner.

Figure 10:
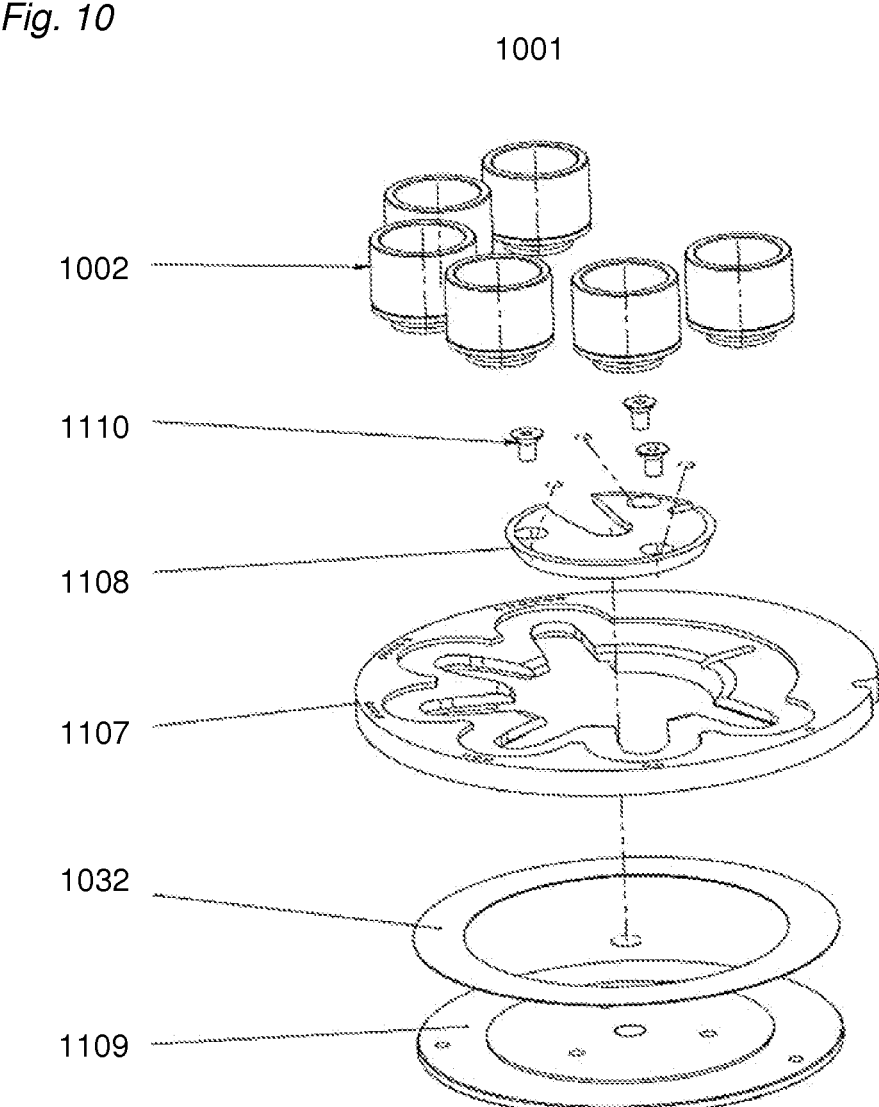
FIG. 10 shows in example of the plate assembly in an exploded view with object holders and an intermediate plate.

FIG. 10 shows an example of the plate assembly in an exploded view with object holders 1002 and an intermediate plate. The plate assembly 1001 comprises a fixture plate 1007, a core plate 1008 arranged in the centre of the fixture plate 1007 and a base plate 1009 onto which both the fixture plate 1007 and the core plate 1008 are arranged. The core plate 1008 is fixed to the base plate 1009 by means of fixing know to the skilled person, such as screws 1010 extending through the core plate 1008 to the base plate 1009.

Between the base plate 1009 and the fixture plate 1007 is arranged an intermediate plate 1032. The intermediate plate may be formed such that friction between the base plate 1009 and the fixture plate 1007 is reduced and the fixture plate 1007 can be turned relative to the base plate 1007 with little effort.

The plates, 1007, 1008 and 1009 in the plate assembly 1001 can be made of metal, such as iron, or the plates can be made of a hard plastics or polymer material, such as Acrylonitrile Butadiene Styrene (ABS), which can be molded, or Polyoxymethylene (POM), which can be milled or molded. The intermediate plate 1032 can be made of a ferromagnetic material, such that a magnetic interaction with a magnetic object holder may hold or contribute to holding the object holder located in the parking area in place during a scanning of an object located in the scanning area.

Although some embodiments have been described and shown in detail, the invention is not restricted to them, but may also be embodied in other ways within the scope of the subject matter defined in the following claims. In particular, it is to be understood that other embodiments may be utilized and structural and functional modifications may be made without departing from the scope of the present invention.

In device claims enumerating several devices, several of these can be embodied by one and the same item of hardware. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, integers, steps or components but does not preclude the presence or addition of one or more other features, integers, steps, components or groups thereof.

The features of the method described above and in the following may be implemented in software and carried out on a data processing system or other devices capable of processing data by the execution of computer-executable instructions. The instructions may be program code loaded in a memory, such as a RAM, from a storage medium or from another computer via a computer network. Alternatively, the described features may be implemented by hardwired circuitry instead of software or in combination with software.

The invention claimed is:

1. An object feeder system configured for arrangement in a three dimensional scanner, the system comprising:
   an object feeder scanning plate assembly comprising a number of tracks, wherein each track is adapted to hold at least one object holder, wherein said tracks are configured to extend within the plate assembly from a parking area towards a scanning area, and where each of the at least one object holder is configured for retaining an object to be scanned in the scanner for obtaining a three dimensional representation of the object; and
   means for moving the at least one object holder in its track;
   wherein the plate assembly comprises a fixture plate and a core plate arranged substantially coaxially relative to each other, where the fixture plate has an opening in its center in which the core plate is arranged; and
   wherein the fixture plate comprises an outer track portion of each of the tracks, and where the core plate comprises one inner track portion, which is configured to align with each of the outer track portions in turn, such that one complete track from the outer edge of the plate assembly to the centre of the plate assembly can be arranged at a time.

2. The object feeder system according to claim 1, wherein the parking area is located at an outer edge of the plate assembly.

3. The object feeder system according to claim 1, wherein the scanning area is substantially at the centre of the plate assembly.

4. The object feeder system according to claim 1, wherein the object feeder scanning plate assembly further comprises a base plate arranged as a base for both the fixture plate and the core plate, and where the base plate is adapted to be mounted on an axis in a 3D scanner.

5. The object feeder system according to claim 4, wherein each outer track portion in the fixture plate comprises a recess on the side of the fixture plate facing the base plate.

6. The object feeder system according to claim 4, wherein the inner track portion in the core plate comprises a recess on the side of the core plate facing the base plate.

7. The object feeder system according to claim 4, wherein the base plate comprises a magnet including a permanent magnet or an electromagnet.

8. The object feeder system according to claim 1, wherein the at least one object holder is secured in the tracks, so that the at least one object holder cannot be removed from the tracks and thereby from the plate assembly, when the plate assembly and the at least one object holder are assembled and configured for normal use.

9. The object feeder system according to claim 1, wherein the plate assembly is adapted to comprise a number of object holders in such a manner that there remains a free space on the plate assembly, where there are no tracks and therefore never any object holders, such that there is visual access to the scanning area across the part of the plate where there are no tracks and no object holders.

10. The object feeder system according to claim 1, wherein the at least one object holder is made of a magnetic material.

11. The object feeder system according to claim 1, wherein the means for moving the at least one object holder comprises an object feeder arm assembly.

12. The object feeder system according to claim 11, wherein the object feeder arm assembly comprises a first arm configured for moving the at least one object holder one at a time.

13. The object feeder system according to claim 12, wherein the first arm comprises a head member comprising an electromagnet, which is adapted to be turned on when the first arm starts contacting one of the at least one object holder to move it from the scanning area to the parking area of the plate assembly.

14. The object feeder system according to claim 11, wherein the arm assembly further comprises a second arm configured for locking the fixture plate in a specific position.

15. The object feeder system according to claim 1, wherein the object feeder system is configured for removable insertion into the scanner.

16. A three dimensional scanner configured for insertion of the object feeder system according to claim 1.

17. The object feeder system according to claim 1, wherein each of the tracks comprises a groove formed in the object feeder scanning plate.

* * * * *